United States Patent
Vasseur et al.

(10) Patent No.: US 12,074,789 B1
(45) Date of Patent: Aug. 27, 2024

(54) GATHERING LABELS FROM PROPRIETARY APPLICATIONS FOR QoE PREDICTIONS

(71) Applicant: Cisco Technology, Inc., San Jose, CA (US)

(72) Inventors: Jean-Philippe Vasseur, Combloux (FR); Grégory Mermoud, Venthône (CH); Eduard Schornig, Haarlem (NL); Michal Wladyslaw Garcarz, Cracow (PL); Pierre-André Savalle, Rueil-Malmaison (FR)

(73) Assignee: Cisco Technology, In nc., San Jose, CA (US)

( * ) Notice: Subject to any disclaimer, the term of this patent is extended or adjusted under 35 U.S.C. 154(b) by 0 days.

(21) Appl. No.: 18/199,503

(22) Filed: May 19, 2023

(51) Int. Cl.
*H04L 45/302* (2022.01)
*H04L 41/16* (2022.01)
*H04L 45/12* (2022.01)

(52) U.S. Cl.
CPC .......... *H04L 45/3065* (2013.01); *H04L 41/16* (2013.01); *H04L 45/123* (2013.01)

(58) Field of Classification Search
CPC ....... H04L 41/16; H04L 45/08; H04L 45/123; H04L 45/302; H04L 45/3065
See application file for complete search history.

(56) References Cited

U.S. PATENT DOCUMENTS

| | | | |
|---|---|---|---|
| 10,701,394 B1 * | 6/2020 | Caballero | G06N 3/045 |
| 11,049,040 B2 | 6/2021 | Mondal et al. | |
| 11,456,926 B1 * | 9/2022 | Mermoud | H04L 41/5067 |
| 2016/0277532 A1 * | 9/2016 | Lee | H04L 67/02 |
| 2019/0238443 A1 * | 8/2019 | Di Pietro | H04L 41/0853 |
| 2019/0303726 A1 | 10/2019 | Côté et al. | |
| 2019/0312791 A1 | 10/2019 | Ligata et al. | |
| 2021/0073377 A1 * | 3/2021 | Coull | G06N 3/045 |
| 2021/0319554 A1 * | 10/2021 | Yu | G06N 3/04 |
| 2022/0045959 A1 | 2/2022 | Chauhan | |
| 2022/0352995 A1 * | 11/2022 | Kudo | H04B 17/27 |
| 2022/0374785 A1 * | 11/2022 | Ishikawa | G06V 10/82 |
| 2022/0400065 A1 | 12/2022 | Cioffi et al. | |
| 2023/0128567 A1 * | 4/2023 | Mermoud | H04L 45/08 709/223 |

FOREIGN PATENT DOCUMENTS

WO    2022029465    2/2022

* cited by examiner

*Primary Examiner* — Jeong S Park
(74) *Attorney, Agent, or Firm* — BEHMKE INNOVATION GROUP LLC; James M. Behmke; James J. Wong

(57) ABSTRACT

In one embodiment, a device obtains quality of experience labels for an online application accessible via a network. The device also obtains telemetry data from the network that is associated with quality of experience labels. The device makes, based on the quality of experience labels and telemetry data, a determination as to whether the online application is similar to a second online application for which a prediction model is already available. The device trains, based on the determination, a prediction model for the online application to predict a quality of experience metric for the online application.

20 Claims, 9 Drawing Sheets

US 12,074,789 B1

GATHERING LABELS FROM PROPRIETARY APPLICATIONS FOR QoE PREDICTIONS

TECHNICAL FIELD

The present disclosure relates generally to computer networks, and, more particularly, to gathering labels from proprietary applications for quality of experience (QoE) predictions.

BACKGROUND

For decades, computer networks have used Key Performance Indicator (KPIs) such as delay, loss, and jitter as proxies for the true user experience of online applications. More specifically, network administrators typically set different Service Level Agreements (SLAs) for different applications, under the assumption that there are certain KPI thresholds at which the user experience of an application becomes degraded. For instance, a voice application may be considered to give poor user experience when it violates an SLA such as: latency>300 ms or loss>3% or jitter>50 ms.

However, the link between different SLA thresholds and degraded application experience is often debatable and the granularity of the KPIs also makes the measured values largely irrelevant for this purpose. For instance, a network path experiencing a constant delay of 120 ms for a voice application over a period of ten minutes provides a very different user experience than a path with the same average delay that keeps varying between 20 ms and 450 ms. In other words, simply relying on traditional KPIs to detect degraded application experience is not enough, in many instances.

With recent advancements in machine learning/artificial intelligence, it now becomes possible to predict the true quality of experience (QoE) of an application, instead of simply using SLA thresholds as a proxy. However, obtaining ground truth QoE labels in the way of user feedback can often be challenging, particularly in the case of proprietary applications for which the relationship between the QoE and the performance of the network is unknown.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
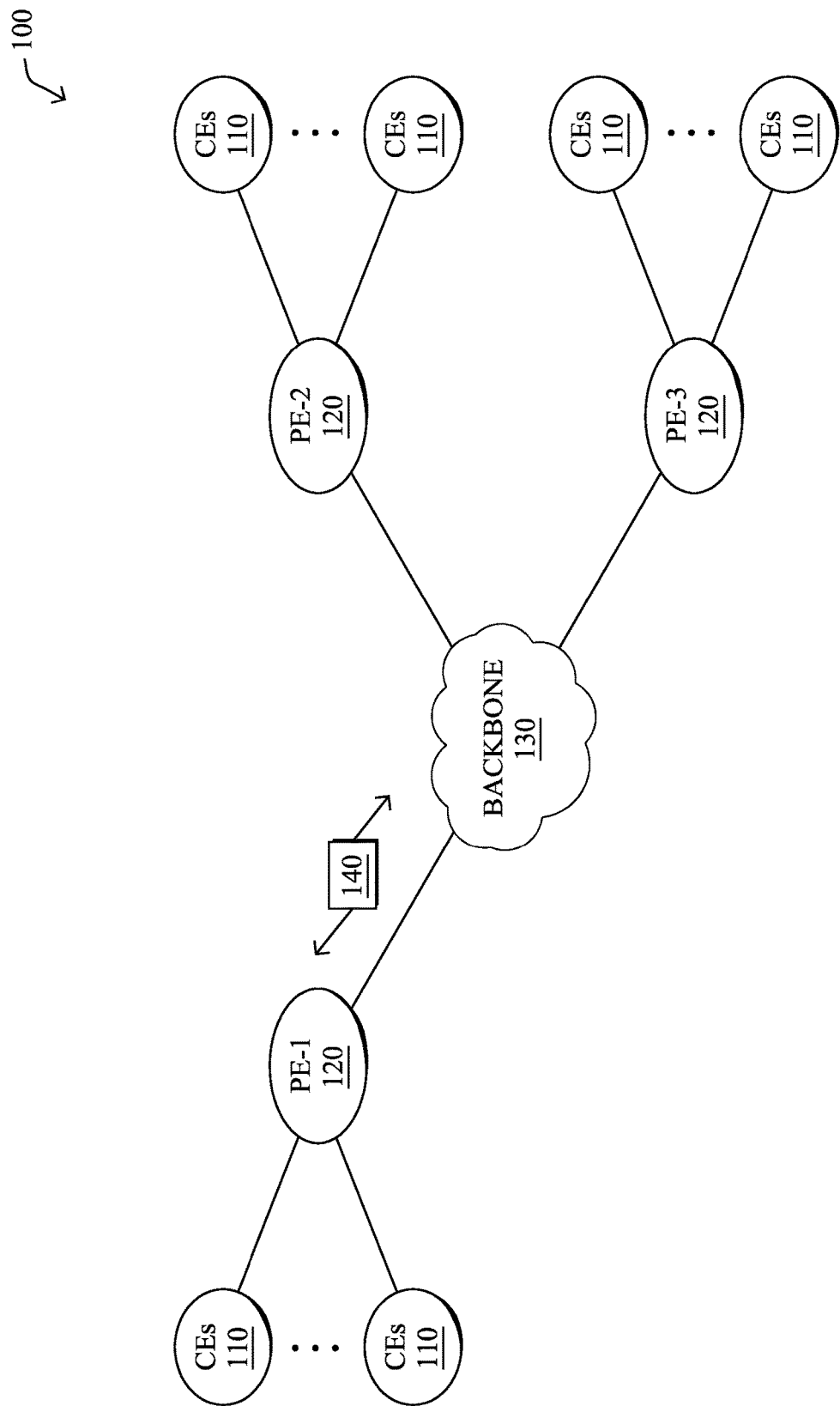
FIGS. 1A-1B illustrate an example communication network.

According to one or more embodiments of the disclosure, a device obtains quality of experience labels for an online application accessible via a network. The device also obtains telemetry data from the network that is associated with quality of experience labels. The device makes, based on the quality of experience labels and telemetry data, a determination as to whether the online application is similar to a second online application for which a prediction model is already available. The device trains, based on the determination, a prediction model for the online application to predict a quality of experience metric for the online application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
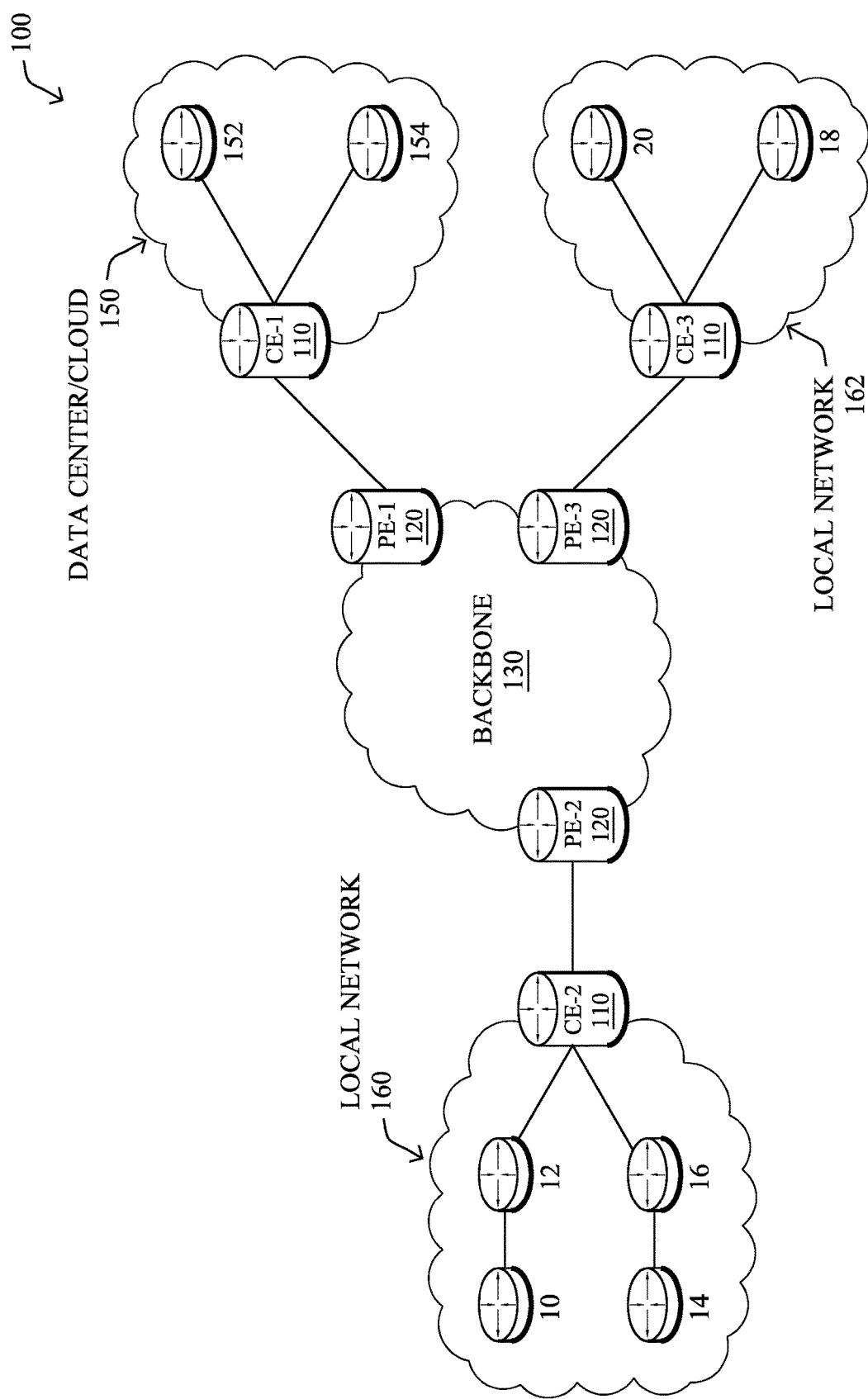

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
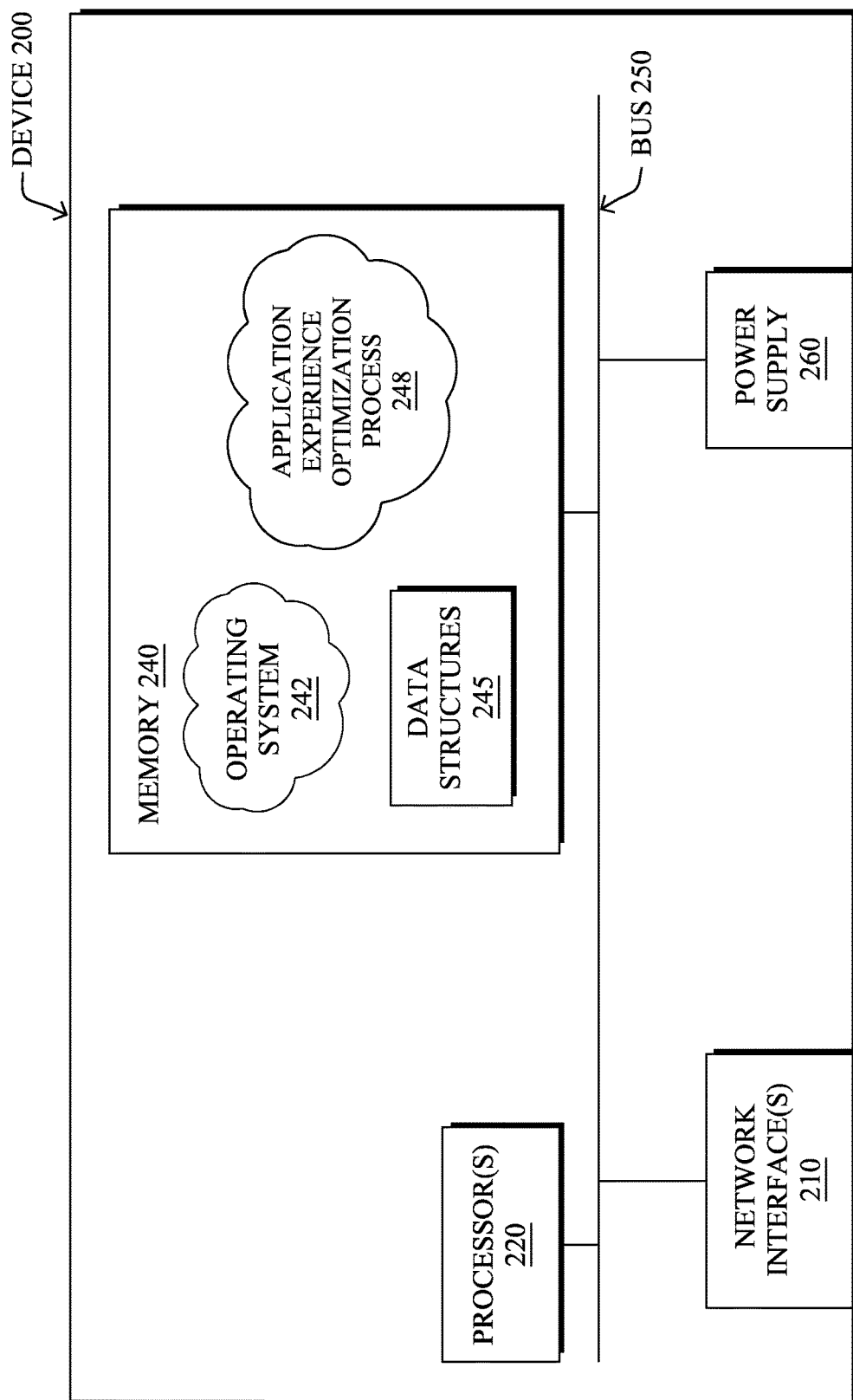
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
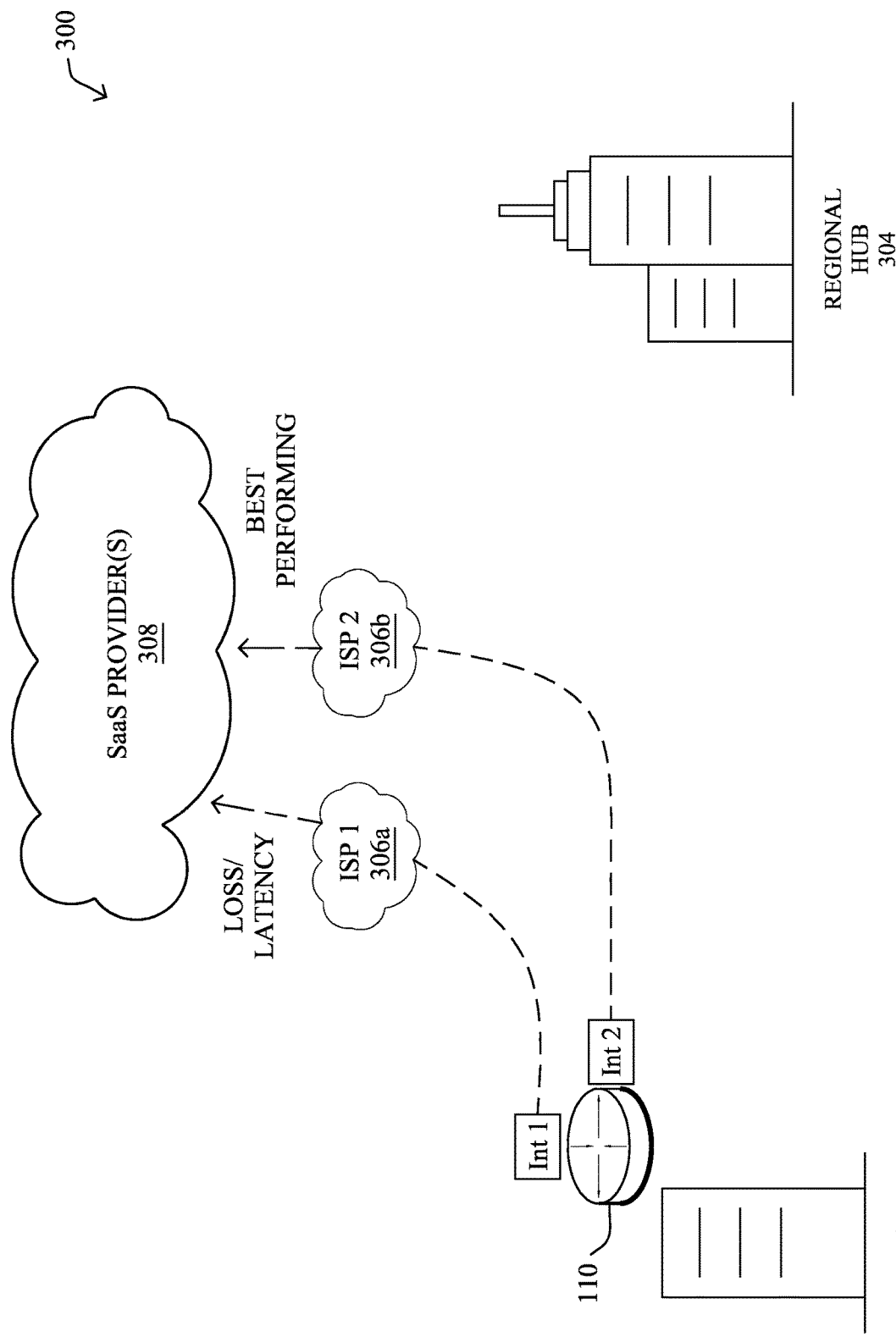
FIGS. 3A-3B illustrate example network deployments.
Figure 3B:
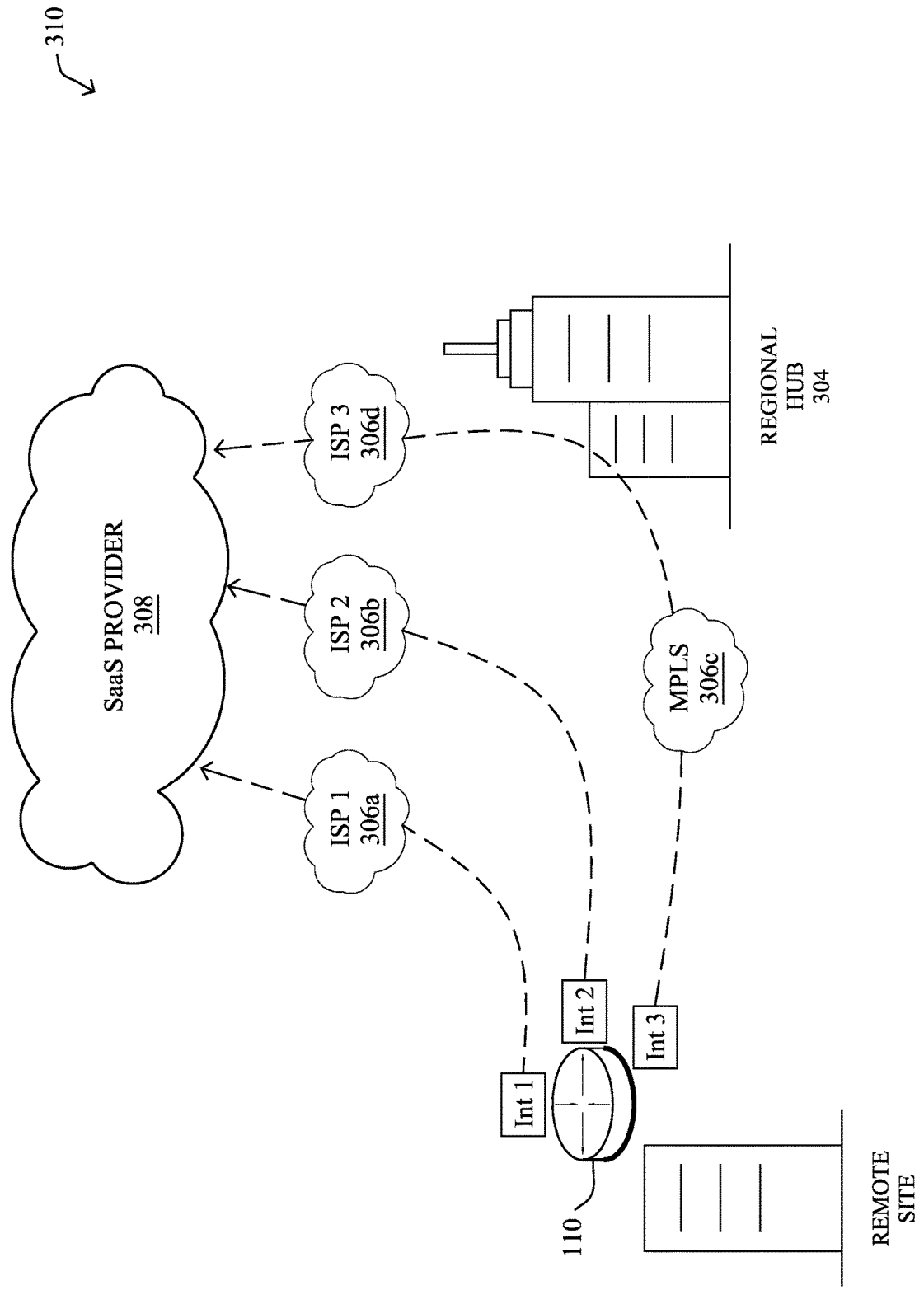

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
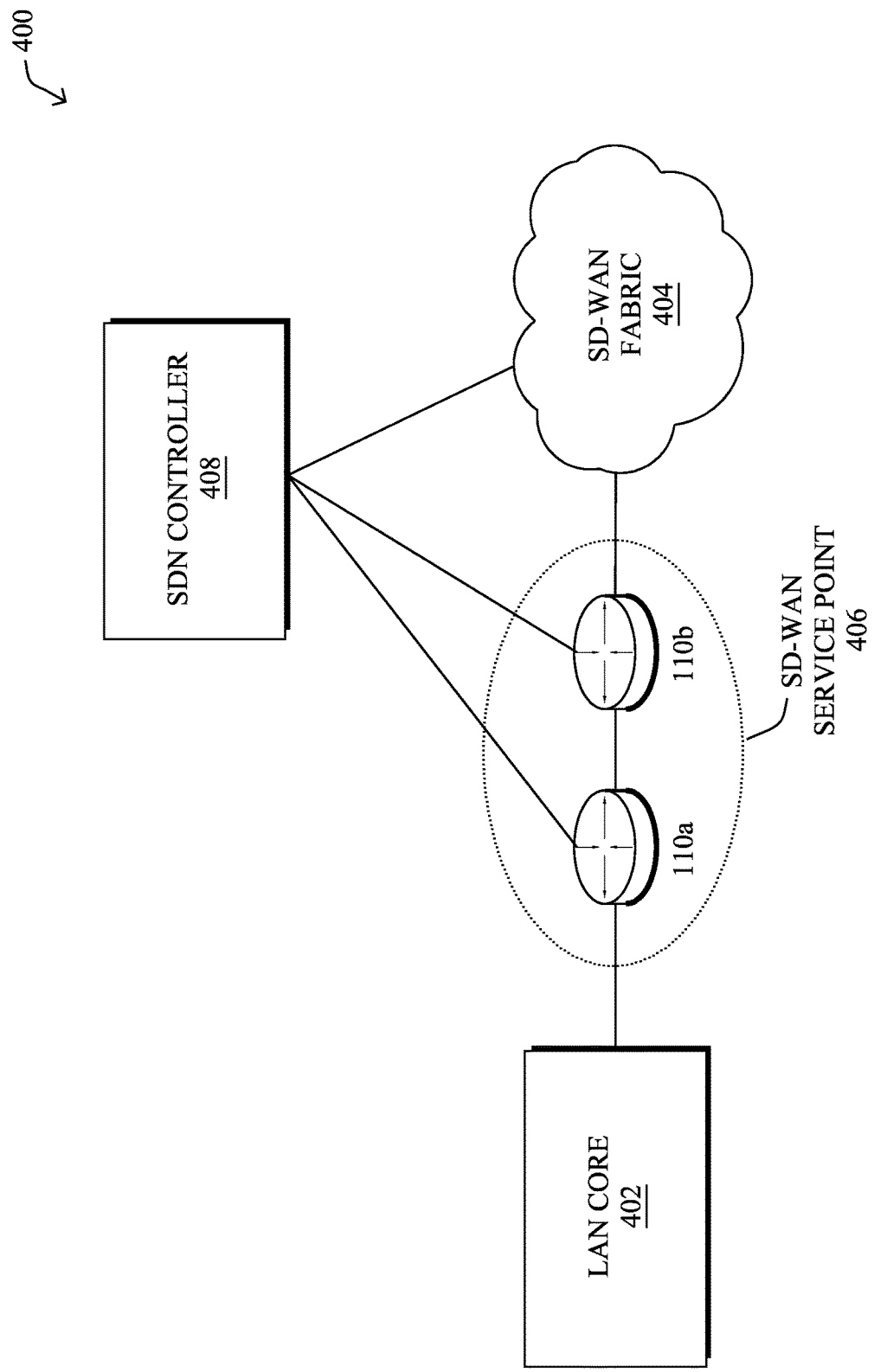
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:

New in-house applications being deployed;
New SaaS applications being deployed everywhere in the network, hosted by a number of different cloud providers;
Internet. MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed.' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
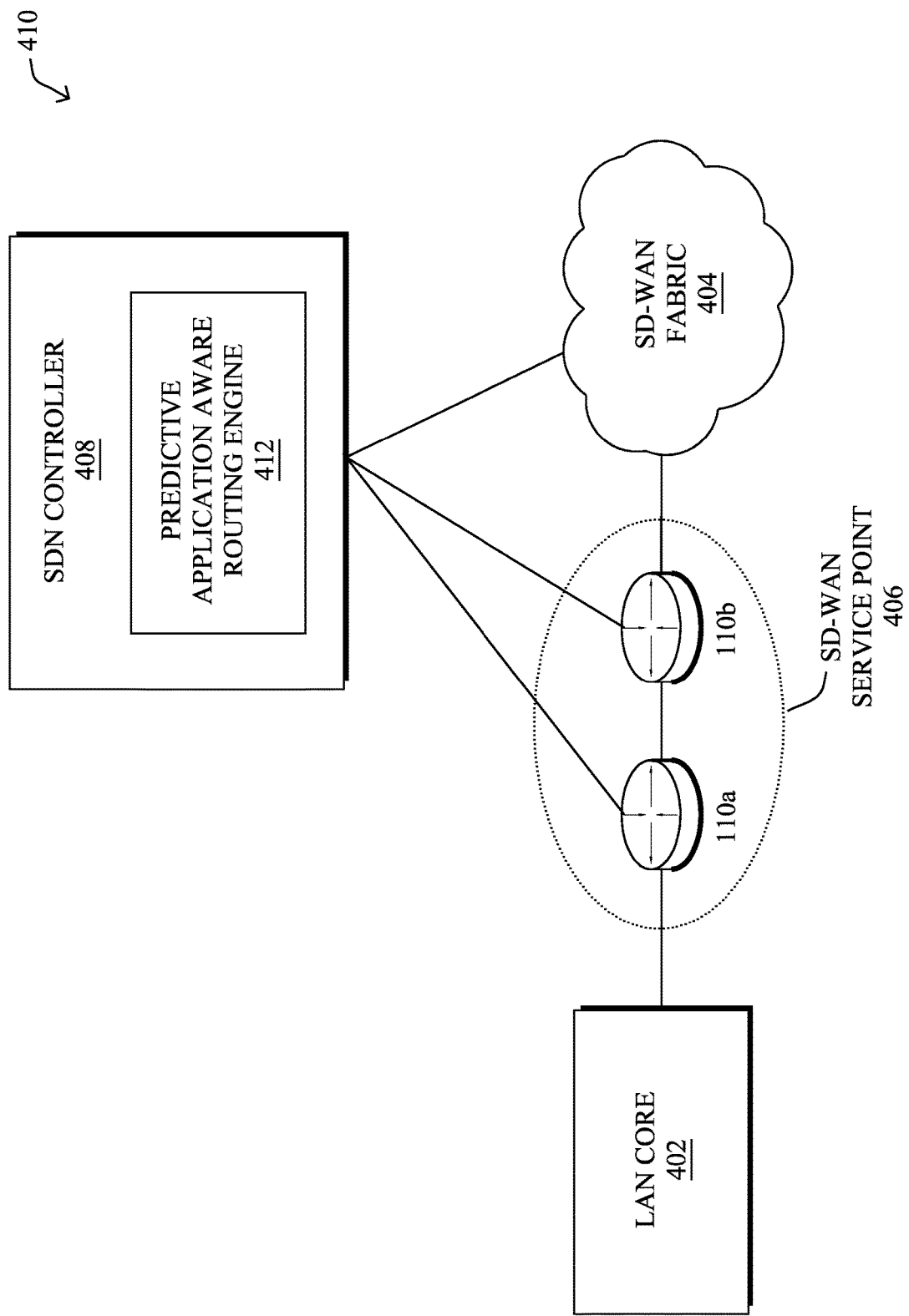

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches." which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modem applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, though, extending cognitive networking to proprietary applications, especially, can be quite challenging. Indeed, extending cognitive networking to proprietary applications for which user feedback is available but the relation with network characteristics is unknown, thus requiring case-by-case troubleshooting when issues take place and without knowing whether the network even plays a role in the QoE for this application.

——Gathering Labels from Proprietary Applications for QoE Predictions——

The techniques introduced herein allow for training a user experience (QoE) model for a proprietary application for which such a model does not exist, while considering it as a black box. In some aspects, a new application programming interface (API) is introduced that allows for retrieving labels for the proprietary application of interest Ai (where labels reflect user experience) along with contextual information (e.g., location of the client, application, timestamp, proprietary variables specific to the said application). A second component gathers the path network characteristics matching the user experience to build a "training" set. Then the system determines whether an existing model can be used and refined using ML transfer learning to provide a QoE model for the proprietary application of interest.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device obtains quality of experience labels for an online application accessible via a network. The device also obtains telemetry data from the network that is associated with quality of experience labels. The device makes, based on the quality of experience labels and telemetry data, a determination as to whether the online application is similar to a second online application for which a prediction model is already available. The device trains, based on the determination, a prediction model for the online application to predict a quality of experience metric for the online application.

Figure 5:
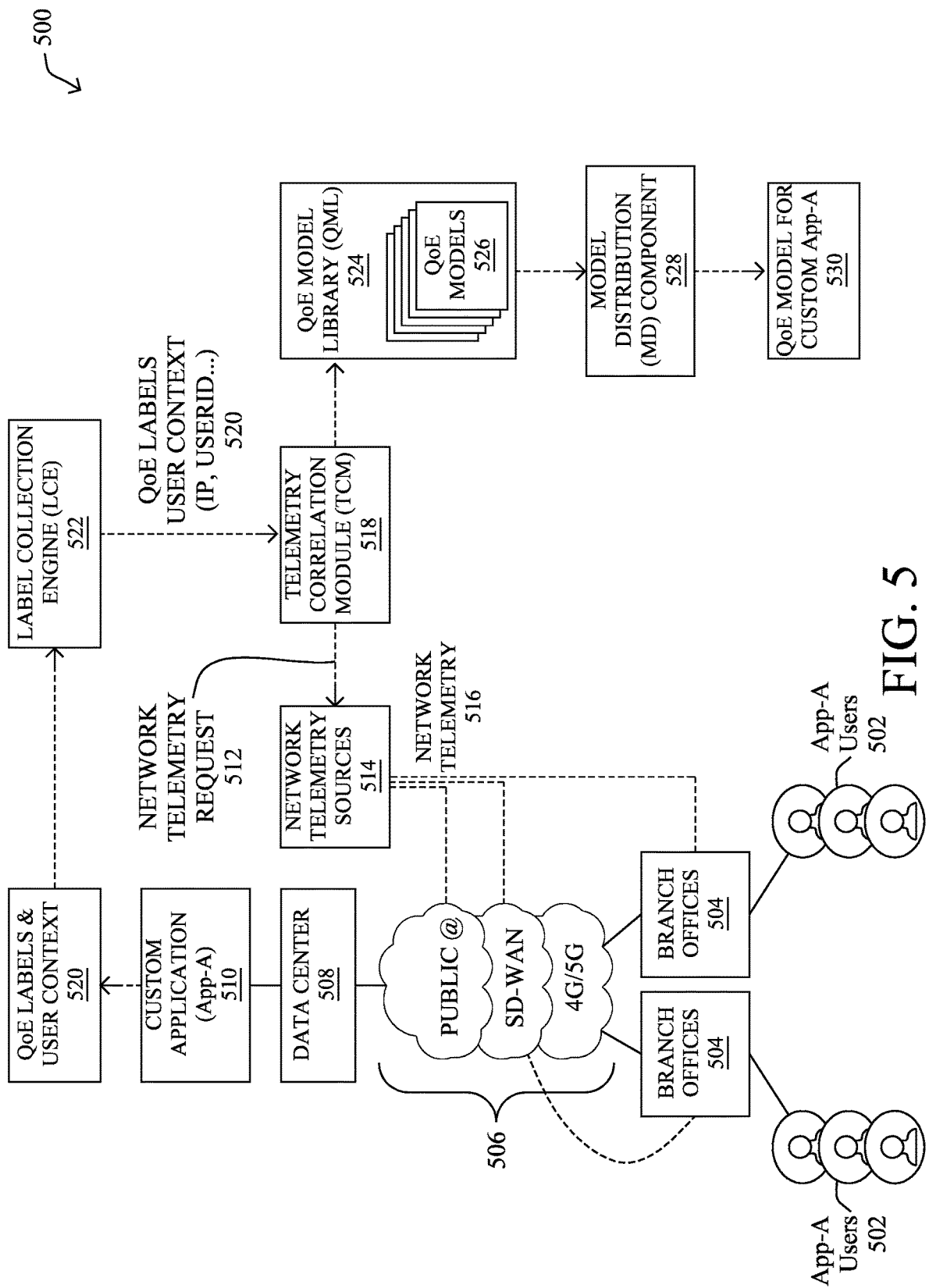
FIG. 5 illustrates an example architecture for gathering labels from proprietary applications for quality of experience (QoE) predictions.

Operationally, FIG. 5 illustrates an example architecture 500 for gathering labels from proprietary applications for quality of experience (QoE) predictions, according to various embodiments. As shown, assume that there are various application users 502 of a custom application 510 (App-A) hosted in a data center 508 or, alternatively, the cloud. These application users 502 may do so by operating their own client endpoints (e.g., mobile devices, personal computers, etc.) located at any number of branch offices 504 of an enterprise and communicate with custom application 510 via any number of different connectivity options, such as public Internet, SD-WAN, 4G/5G cellular, or the like.

According to various embodiments, architecture 500 may include a label correlation engine 522 (LCE) that leverages an application programming interface (API) to gather QoE label information 520 (e.g., user feedback information) for the various application users 502. Such an API could be RESTful in pull (polling) mode, that is, allowing label correlation engine 522 to request additional labels related to custom application 510, or it could take the form of a push model where labels are continuously streamed from the application towards label correlation engine 522. Regardless of the pull or push implementation, QoE label information 520 may also include additional context information, as well, regarding the labels. For instance, in addition to the attributes reflecting the user experience (e.g., a scalar from 1 to x, a flag good/degraded/bad, etc.), QoE label information 520 may also include contextual information such as the user ID, IP/MAC address, application ID, location of the application (e.g., URL), the software client details, etc., that are associated with a given label.

Optionally, QoE label information 520 could further include telemetry indicative of network conditions (e.g. delay, loss, etc.) as assessed by the application in conjunction with the QoE labels. Moreover, additional (proprietary) variables may be required if they are considered as critical to predict the user experience (QoE) by a machine learning model (e.g. codec attributes for a voice/video application, HL7), as discussed below. Note, though, that if additional proprietary variables are provided, no existing QoE model could be reused and a new model will need to be trained.

According to various embodiments, architecture 500 may also include a telemetry correlation module 518 (TCM) that is responsible for correlating network characteristics with QoE label information 520. To do so, telemetry correlation module 518 may process the contextual information included in QoE label information 520 and determine what telemetry is to be retrieved. For example, telemetry correlation module 518 may use the client IP address of a given client endpoint of an application retrieve the location of the client and use the server URL to determine to the location of the targeted application(s) (e.g., an on-prem datacenter, cloud region, etc.). In turn, telemetry correlation module 518 may use this information to determine the network path between the client and the application that corresponds to the QoE label in addition to the timing.

Once telemetry correlation module 518 has identified the network path(s) of interest, it may send a network telemetry request 512 to any number of network telemetry sources associated with the network. For instance, network telemetry sources 514 may include an SD-WAN controller that provides SD-WAN controller analytics (e.g. vAnalytics SD-WAN), a path probing mechanism, such as a ThousandEyes agent (corresponding to the client to which the label corresponds), and/or other sources of telemetry potentially provided by the proprietary application (e.g., some proprietary applications have their own source of telemetry embedded in the client application). In turn, network telemetry sources 514 may collect the requested network telemetry 516 and report it back to telemetry correlation module 518 for further processing.

In one embodiment, network telemetry sources 514 may gather network telemetry 516 on-the-fly. For instance, on receiving a QoE label, telemetry correlation module 518 may trigger a networking test between the client source and destination (using for example a path traceroute or pre-determined ThousandEyes test). In a second embodiment, network telemetry 516 may already be available, in which case telemetry correlation module 518 may simply retrieve the existing networking telemetry 516 from network telemetry sources 514.

In various embodiments, QoE model library 524 (QML) may be configured to train a QoE prediction model for a given application, such as custom application 510. To do so, QoE model library 524 may transfer learning. Generally, transfer learning refers to the ability to use an existing model that was trained for another task, and potentially a different features space, for a new task (e.g., predicting the QoE of custom application 510). More specifically, QoE model library 524 may determine whether there already exists a model in its library of QoE models 526 having a feature space and target domains with enough similarity to that of custom application 510.

By way of example, assume that custom application 510 is a proprietary voice/video application. In such a case, QoE model library 524 may select an existing model in QoE model library 524 trained for Webex, potentially after matching the input features space (e.g., converting some variables used by custom application 510) or even selecting a subset of the input variables provided by custom application 510 that do not exist for the existing model (and vice-versa). Such a technique is also referred to as Heterogeneous Inductive Transfer Learning. Note QoE model library 524 may also need to convert the proprietary labels to one of the label formats available with the set of QoE models 526. For instance, QoE label information 520 may include user ratings taking the form of a discrete number of values between 1 and 5 (e.g., 1-5 stars), a MoS score as a continuous variable between 1 and 5, or even a simpler approach using a binary label (thumbs up or down). However, assume that QoE models 526 have been trained to predict user feedback using different outcomes (e.g., 0=bad and 1=good or a probability of satisfaction) that do not correspond to the format of labels for custom application 510. In such a case, QoE model library 524 may first perform a mapping of this information.

Alternatively, such as when transfer learning cannot be used (e.g., due to a very different target space, input features, etc.) or the efficacy of the trained model for custom application 510 using transfer learning performs poorly, QoE model library 524 could simply train a new model for custom application 510 from scratch and add it to QoE models 526.

Finally, model distribution component 528 (MD) allows for the system to deliver the QoE prediction model 530 trained for custom application 510 to an engine responsible for making inferences about the QoE (e.g., a predictive routing engine, etc.). Optionally, QoE prediction model 530 may also be accompanied with its performance characteristics (e.g., set of performance metrics such as the Area Under the Curve (AUC), cross-entropy, brier score, etc.). In addition, QoE prediction model 530 could also be stored in QoE models 526 to allow for future retraining upon collecting additional feedback. In some instances, the API may allow the client to request regular retraining based on time, the number of labels collected (e.g., retrained each time X more labels are collected), upon detecting a plateau on the loss-score of the algorithm, when crossing a threshold for a performance metric (e.g. AUC<x), or at any other time.

Figure 6:
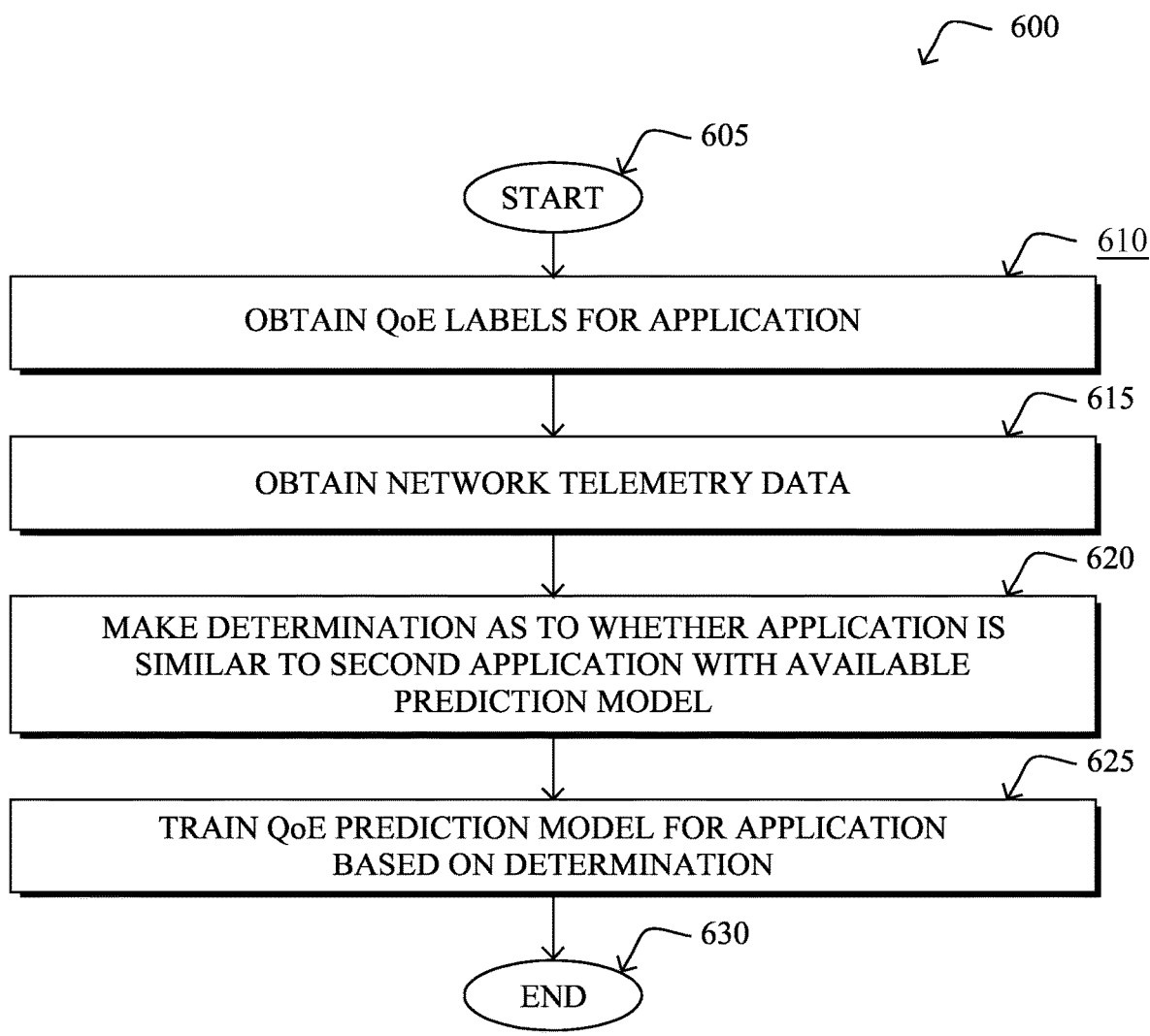
FIG. 6 illustrates an example simplified procedure for gathering labels from proprietary applications for QoE predictions.

FIG. 6 illustrates an example simplified procedure (e.g., a method) for gathering labels from proprietary applications for QoE predictions, in accordance with one or more embodiments described herein. For example, a non-generic, specifically configured controller for a network (e.g., device 200) may perform procedure 600 by executing stored instructions (e.g., application experience optimization process 248). The procedure 600 may start at step 605, and continues to step 610, where, as described in greater detail above, the device may obtain quality of experience labels for an online application accessible via a network. In some embodiments, the quality of experience labels are based on user feedback provided by users of the online application. In another embodiment, the device obtains the quality of experience labels from the online application (e.g., via an API). In one embodiment, the online application is a proprietary application associated with a particular enterprise.

At step 615, as detailed above, the device may obtain telemetry data from the network that is associated with quality of experience labels. In some embodiments, the device obtains the telemetry data from a path probing mechanism in the network or from a network controller.

At step 620, the device may make, based on the quality of experience labels and telemetry data, a determination as to whether the online application is similar to a second online application for which a prediction model is already available, as described in greater detail above. In some embodiments, the device may also the quality of experience labels into a format of quality of experience labels used by the prediction model for the second online application. In another embodiment, the device stores the prediction model for the second online application in a library of prediction models for a plurality of online applications.

At step 625, as detailed above, the device may train, based on the determination, a prediction model for the online application to predict a quality of experience metric for the online application. In various embodiments, the device may also deploy the prediction model for the online application for use by a predictive routing engine that reroutes traffic associated with the online application based on the quality of experience metric predicted by the prediction model. In one embodiment, the determination indicates that the online application is similar to the second online application and the device trains the prediction model for the online application to predict the quality of experience metric for the online application by using transfer learning to train the prediction model for the online application using the prediction model for the second online application. In another embodiment, the determination indicates that the online application is dissimilar to the second online application and the device trains the prediction model for the online application to predict the quality of experience metric for the online application using the quality of experience labels and the telemetry data.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for gathering labels from proprietary applications for QoE predictions, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, quality of experience labels for an online application accessible via a network;
obtaining, by the device, telemetry data from the network that is associated with quality of experience labels;
making, by the device and based on the quality of experience labels and telemetry data, a determination as to whether the online application is similar to a second online application for which a given Prediction model is already available; and
training, by the device and based on the determination, a prediction model for the online application to predict a quality of experience metric for the online application.

2. The method as in claim 1, further comprising:
deploying, by the device, the prediction model for the online application for use by a predictive routing engine that reroutes traffic associated with the online application based on the quality of experience metric predicted by the prediction model.

3. The method as in claim 1, wherein the quality of experience labels are based on user feedback provided by users of the online application.

4. The method as in claim 1, wherein the device obtains the quality of experience labels from the online application.

5. The method as in claim 1, wherein the determination indicates that the online application is similar to the second online application, and wherein training the prediction model for the online application to predict the quality of experience metric for the online application comprises:
using transfer learning to train the prediction model for the online application using the given Prediction model for the second online application.

6. The method as in claim 1, wherein the determination indicates that the online application is dissimilar to the second online application, and wherein training the prediction model for the online application to predict the quality of experience metric for the online application comprises:
training the prediction model for the online application using the quality of experience labels and the telemetry data.

7. The method as in claim 1, wherein the device obtains the telemetry data from a path probing mechanism in the network or from a network controller.

8. The method as in claim 1, wherein making the determination comprises:
converting the quality of experience labels into a format of quality of experience labels used by the given Prediction model for the second online application.

9. The method as in claim 1, wherein the device stores the given prediction model for the second online application in a library of prediction models for a plurality of online applications.

10. The method as in claim 1, wherein the online application is a proprietary application associated with a particular enterprise.

11. An apparatus, comprising:
one or more network interfaces;
a processor coupled to the one or more network interfaces and configured to execute one or more processes; and
a memory configured to store a process that is executable by the processor, the process when executed configured to:

obtain quality of experience labels for an online application accessible via a network;

obtain telemetry data from the network that is associated with quality of experience labels;

make, based on the quality of experience labels and telemetry data, a determination as to whether the online application is similar to a second online application for which a given Prediction model is already available; and train, based on the determination, a prediction model for the online application to predict a quality of experience metric for the online application.

12. The apparatus as in claim 11, wherein the process when executed is further configured to:

deploy the prediction model for the online application for use by a predictive routing engine that reroutes traffic associated with the online application based on the quality of experience metric predicted by the prediction model.

13. The apparatus as in claim 11, wherein the quality of experience labels are based on user feedback provided by users of the online application.

14. The apparatus as in claim 11, wherein the apparatus obtains the quality of experience labels from the online application.

15. The apparatus as in claim 11, wherein the determination indicates that the online application is similar to the second online application, and wherein the apparatus trains the prediction model for the online application to predict the quality of experience metric for the online application by:

using transfer learning to train the prediction model for the online application using the given Prediction model for the second online application.

16. The apparatus as in claim 11, wherein the determination indicates that the online application is dissimilar to the second online application, and wherein the apparatus trains the prediction model for the online application to predict the quality of experience metric for the online application by:

training the prediction model for the online application using the quality of experience labels and the telemetry data.

17. The apparatus as in claim 11, wherein the apparatus obtains the telemetry data from a path probing mechanism in the network or from a network controller.

18. The apparatus as in claim 11, wherein the apparatus makes the determination by:

converting the quality of experience labels into a format of quality of experience labels used by the given Prediction model for the second online application.

19. The apparatus as in claim 11, wherein the apparatus stores the given prediction model for the second online application in a library of prediction models for a plurality of online applications.

20. A tangible, non-transitory, computer-readable medium storing program instructions that cause a device to execute a process comprising:

obtaining, by the device, quality of experience labels for an online application accessible via a network;

obtaining, by the device, telemetry data from the network that is associated with quality of experience labels;

making, by the device and based on the quality of experience labels and telemetry data, a determination as to whether the online application is similar to a second online application for which a given Prediction model is already available; and training, by the device and based on the determination, a prediction model for the online application to predict a quality of experience metric for the online application.

\* \* \* \* \*

UNITED STATES PATENT AND TRADEMARK OFFICE
CERTIFICATE OF CORRECTION

| | | |
|---|---|---|
| PATENT NO. | : 12,074,789 B1 | Page 1 of 1 |
| APPLICATION NO. | : 18/199503 | |
| DATED | : August 27, 2024 | |
| INVENTOR(S) | : Jean-Philippe Vasseur et al. | |

It is certified that error appears in the above-identified patent and that said Letters Patent is hereby corrected as shown below:

In the Specification

Column 9, Line 31 please amend as shown:
QoE by sending HyperText Transfer Protocol (HTTP)

Column 10, Line 24 please amend as shown:
"patches," which are typically temporary in nature (e.g., Column 11, Line 33 please amend as shown:
allowing the Internet to scale. Still, with modern applications Signed and Sealed this
Twenty-sixth Day of November, 2024

Katherine Kelly Vidal
*Director of the United States Patent and Trademark Office*